United States Patent
Naroditsky et al.

(10) Patent No.: US 11,997,145 B1
(45) Date of Patent: May 28, 2024

(54) ACCOUNT REGISTRATION SESSION MANAGEMENT OPERATIONS USING CONCURRENT PRELIMINARY RISK SCORING

(71) Applicant: Wells Fargo Bank, N.A., San Francisco, CA (US)

(72) Inventors: Tessa C. Naroditsky, San Francisco, CA (US); Yvonne Yue-Hong Zhao, San Francisco, CA (US); Adrianne M. Petrutis-Brewer, Fresno, CA (US); Elizabeth M. Scott, Charlotte, NC (US); Ka Leung, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/820,335

(22) Filed: Aug. 17, 2022

(51) Int. Cl.
*H04L 65/1073* (2022.01)
*H04L 65/1069* (2022.01)
*H04W 12/06* (2021.01)

(52) U.S. Cl.
CPC ...... *H04L 65/1073* (2013.01); *H04L 65/1069* (2013.01); *H04W 12/06* (2013.01)

(58) Field of Classification Search
CPC . H04L 65/1073; H04L 65/1069; H04W 12/06
USPC .......................................................... 709/228
See application file for complete search history.

(56) References Cited

U.S. PATENT DOCUMENTS

| | | | |
|---|---|---|---|
| 8,086,523 B1 * | 12/2011 | Palmer | G06Q 40/03 705/38 |
| 8,856,077 B1 | 10/2014 | Roth et al. | |
| 2014/0297356 A1 | 10/2014 | Jayade | |
| 2016/0086263 A1 * | 3/2016 | Weinflash | G06Q 40/03 705/38 |
| 2017/0193514 A1 * | 7/2017 | Chen | G06Q 20/108 |
| 2021/0049682 A1 * | 2/2021 | Roselli | G06Q 20/12 |
| 2022/0172211 A1 * | 6/2022 | Muthuswamy | G06F 16/9024 |

* cited by examiner

*Primary Examiner* — Suraj M Joshi
(74) *Attorney, Agent, or Firm* — K&L Gates LLP

(57) ABSTRACT

Various embodiments of the present invention describe techniques that perform account registration management operations with respect to an account registration session based on a real-time registration processing output that is generated based on an earlier-generated preliminary risk category, such as a preliminary risk category that is generated before the account registration session is completed. In some embodiments, by generating a component of the real-time registration processing output during the account registration session, the disclosed techniques enable reducing the data processing time associated with generating the real-time registration processing output, thus increasing the speed and operational reliability of an electronic data management system that is configured to perform account registration management operations.

20 Claims, 12 Drawing Sheets

Select Accounts and Services

Select the accounts you want to modify services and settings for review and provide the information under each account and select Add to Request.

Some accounts and services cannot be modified and are not shown here. If you have questions, please contact your Treasury Management Consultant.

[ Open Account ]

| − | Payroll Account...2345 (USD) (New!) |
|---|---|

| Account Type | Existing Services |
|---|---|
| Demand Deposit Account (DDA) | No Services |
| Account Nickname | |
| Western Division  Edit | |

Copy Services

Would you like to copy the services and settings from another account to this account? Settings for copied service cannot be modified.

○ Yes    ○ No

Add Services

Would you like to add additional services to this account?

○ Yes    ○ No

[ Add to Request ]

| + | Disbursement Account...2456 (USD) |
|---|---|
| + | Operating Account...3334 (USD) |
| + | Payroll Account...2146 (EUR) |
| + | Operating Account...3334 (EUR) |
| + | Payroll Account...2146 (USD) |

[ Continue ]   [ Back ]                                               [ Save and Exit ]

FIG. 9

Select Account ✕

[Filters] | [🔍 Find by...] [Go] Reset | 1 to 10 of 80 items [↓] [↑]

| | Account Name and Number ◇ | Account Nickname ◇ | Services |
|---|---|---|---|
| ○ + | Disbursement Account....0147 | Eastern Division | Wires, ACH Payments, Basic Banking, Direct BAI... |
| ○ + | Operating Account....1234 | Western Division | Treasury Information Reporting, Desktop Deposit |
| ○ + | Operating Account....1976 | Southern Division | Wires, ACH Payments, Basic Banking, Direct BAI... |
| ○ + | Operating Account....3334 | Northern Division | Treasury Information Reporting, Desktop Deposit |
| ○ + | Disbursement Account....0137 | Eastern Division #2 | Wires, Desktop Deposit, Direct BAI, Payment... |
| ○ + | Disbursement Account....0907 | Eastern Division #3 | Treasury Information Reporting, Desktop Deposit |
| ○ + | Payroll Account....2146 | Eastern Division #4 | Wires, ACH Payments, Basic Banking, Direct BAI... |
| ○ + | Payroll Account....1124 | Western Division #2 | Treasury Information Reporting, Desktop Deposit |
| ○ + | Payroll Account....8090 | Western Division #3 | Wires, ACH Payments, Basic Banking, Direct BAI... |
| ○ + | Payroll Account....8897 | Eastern Division #5 | Treasury Information Reporting, Desktop Deposit |

Cancel [Add]

- Payroll Account...2345 (USD) (New!)

Account Type
  Demand Deposit Account (DDA)

Existing Services
  No Services

Account Nickname
  Western Division  Edit

Copy Services

Would you like to copy the services and settings from another account to this account?
Settings for copied service cannot be modified.

● Yes  ○ No

Select the account to copy the products and settings from

Disbursement Account....0137 selected  [Edit]

*1101*

Services Added to Account....2345
The following services have been added to the Payroll Account...2345

Select View Settings to see the settings applied to these services. Remove any services you don't want to copy by unselecting the checkbox next to service.

☑ Select All Products

☑ Wire

☑ Desktop Deposit      ☑ Payment Manager

☑ Direct BAI      ☑ Treasury Information Reporting

---

Add Services
Would you like to add additional services to this account?
○ Yes  ○ No

[Add to Request]

*FIG. 11*

Disbursement Account....0137 Services Settings

Review the services and settings below. Select Edit Settings to enter or modify settings. Settings for copied and removed services cannot be modified.

Wires

What transfer methods should be used for this account?
Wire, Book Transfer

What payment creation methods should be used for this account?
Wires

What is the maximum amount you would transfer from this account in one day?
Amount: $15,000

Desktop Deposit

What is the maximum amount you would deposit into this account in one day?
Amount: $15,000

What is the cumulative maximum amount you would deposit into all accounts in one day?
Amount: $30,000

Direct BAI

Report types added on this account
Previous Day (Standard)
Previous Day (Premium)

Report Settings added to this account
Balance/Summary
Transaction detail
Transaction level float/funds

SAFE Transmission folder names
WACH0160_TMDF_1
WACH0160_TMDF_2

[ Close ]

*FIG. 12*

ACCOUNT REGISTRATION SESSION MANAGEMENT OPERATIONS USING CONCURRENT PRELIMINARY RISK SCORING

BACKGROUND

Various embodiments of the present invention address technical challenges associated with speed and operational reliability of account registration management operations and make substantial technical improvements to efficiency and effectiveness of various account registration management operations.

BRIEF SUMMARY

In general, embodiments of the present invention provided herein provide improved execution of account registration management operations. Other implementations for execution of account registration management operations will be, or will become, apparent to a person of ordinary skill in the relevant technology upon examination of the following figures and detailed description. It is intended that all such additional implementations be included within this description be within the scope of the disclosure and be protected by the following claims.

In accordance with at least one aspect of the present invention, a computer-implemented method is provided. In some example embodiments, the example computer-implemented methods are implemented via any one or more computing devices embodied in hardware, software, firmware, and/or a combination thereof, as described herein. An example computer-implemented method includes during the account registration session: receiving a registration request indicative of a requested account type and a user corresponding to the requested account type, wherein the registration request includes one or more authenticated credentials; determining, based on the registration request, one or more related accounts associated with the user; generating, based on the registration request and the one or more related accounts, an account registration data object, wherein one or more input fields of the account registration data object are automatically populated with values described by one or more values defined in the one or more related accounts; determining, based on the one or more of related accounts and using a risk scoring machine learning model, a preliminary risk category for the registration request, wherein the preliminary risk category is selected from a plurality of defined risk categories associated with the requested account type; performing one or more account registration management operations with respect to the account registration session to generate a real-time registration processing output for the account registration session based on the preliminary risk category; and generating one or more account registration notifications based on the real-time registration processing output.

In accordance with another aspect of the present invention, an example apparatus is provided. In at least some embodiments of an example apparatus, the example apparatus includes at least one processor and at least one memory including program code, the at least one memory and the program code configured to, with the processor, cause the apparatus to: during the account registration session: receive a registration request indicative of a requested account type and a user corresponding to the requested account type, wherein the registration request includes one or more authenticated credentials; determine, based on the registration request, one or more related accounts associated with the user; generate, based on the registration request and the one or more related accounts, an account registration data object, wherein one or more input fields of the account registration data object are automatically populated with values described by one or more values defined in the one or more related accounts; determine, based on the one or more related accounts and using a risk scoring machine learning model, a preliminary risk category for the registration request, wherein the preliminary risk category is selected from a plurality of defined risk categories associated with the requested account type; perform one or more account registration management operations with respect to the account registration session to generate a real-time registration processing output for the account registration session based on the preliminary risk category; and generate one or more account registration notifications based on the real-time registration processing output.

In accordance with yet another aspect of the disclosure, an example computer program product is provided. In at least some embodiments of an example computer program product, the example computer program product includes at least one non-transitory computer-readable storage medium having computer-readable program code portions stored therein, the computer-readable program code portions configured to: during the account registration session: receive a registration request indicative of a requested account type and a user corresponding to the requested account type, wherein the registration request includes one or more authenticated credentials; determine, based on the registration request, one or more related accounts associated with the user; generate, based on the registration request and the one or more related accounts, an account registration data object, wherein one or more input fields of the account registration data object are automatically populated with values described by one or more values defined in the one or more related accounts; determine, based on the one or more related accounts and using a risk scoring machine learning model, a preliminary risk category for the registration request, wherein the preliminary risk category is selected from a plurality of defined risk categories associated with the requested account type; perform one or more account registration management operations with respect to the account registration session to generate a real-time registration processing output for the account registration session based on the preliminary risk category; and generate one or more account registration notifications based on the real-time registration processing output.

BRIEF DESCRIPTION OF THE DRAWINGS

Figure 1:
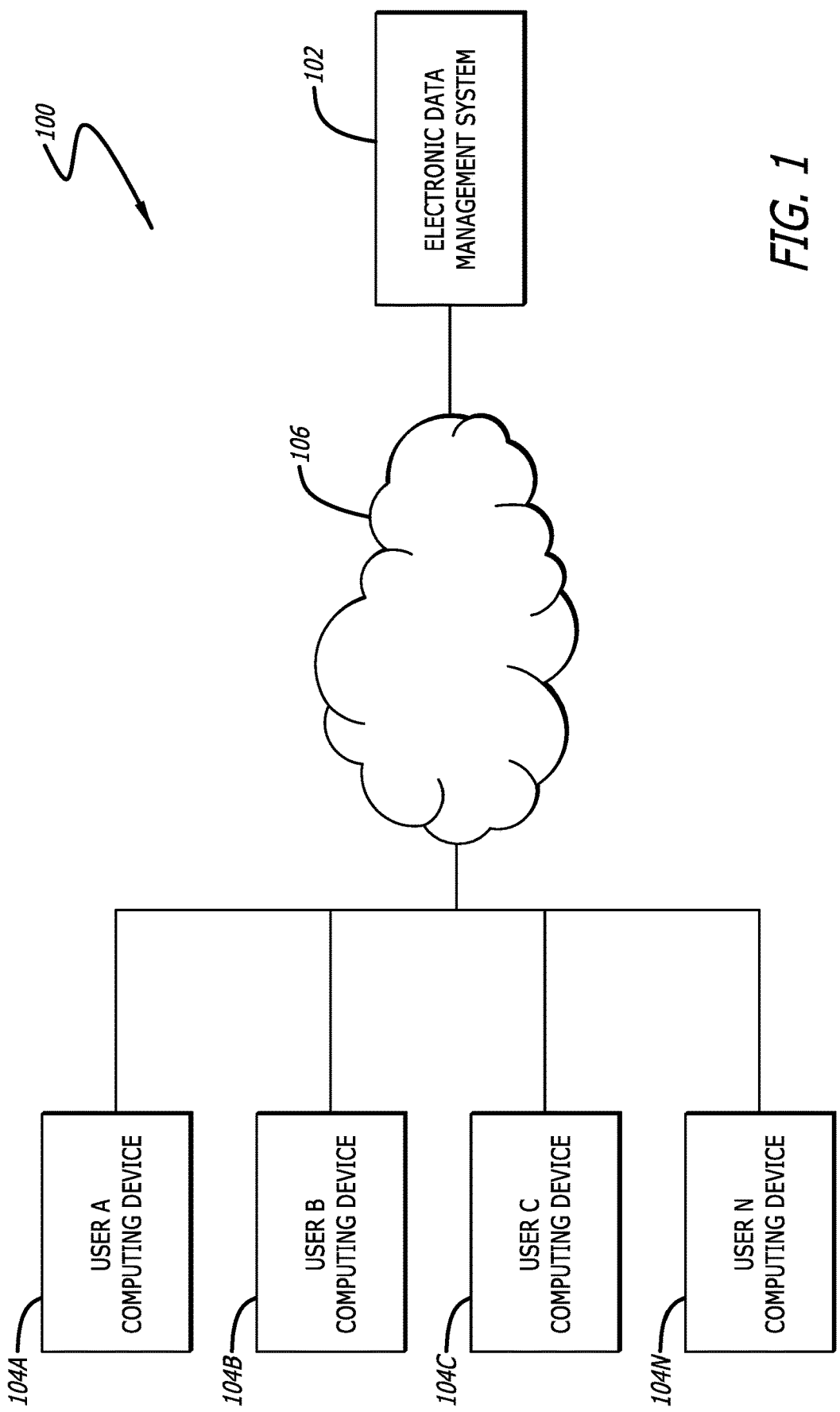

Having thus described the embodiments of the disclosure in general terms, reference now will be made to the accompanying drawings, which are not necessarily drawn to scale, and wherein:

FIG. 1 provides a block diagram of a system that may be specially configured within which embodiments of the present invention may operate.

Figure 2:
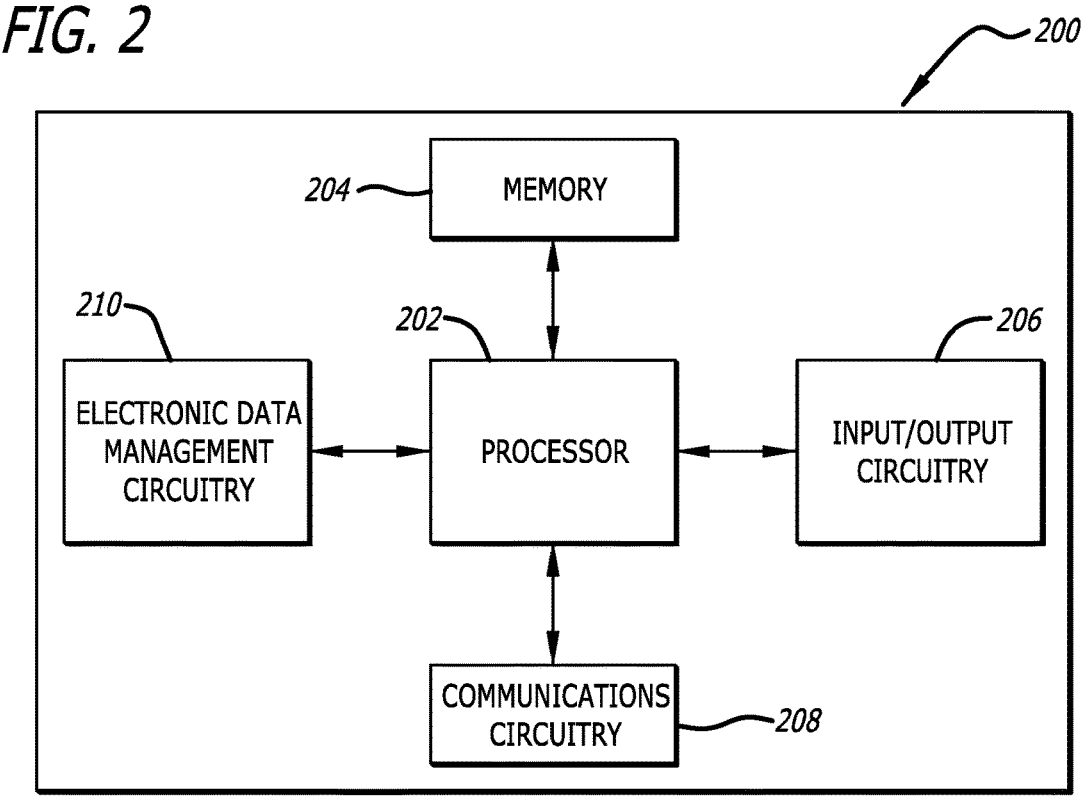

FIG. 2 provides a block diagram of an example apparatus embodying an electronic data management system that may be specially configured in accordance with at least one example embodiment of the present invention.

Figure 3:
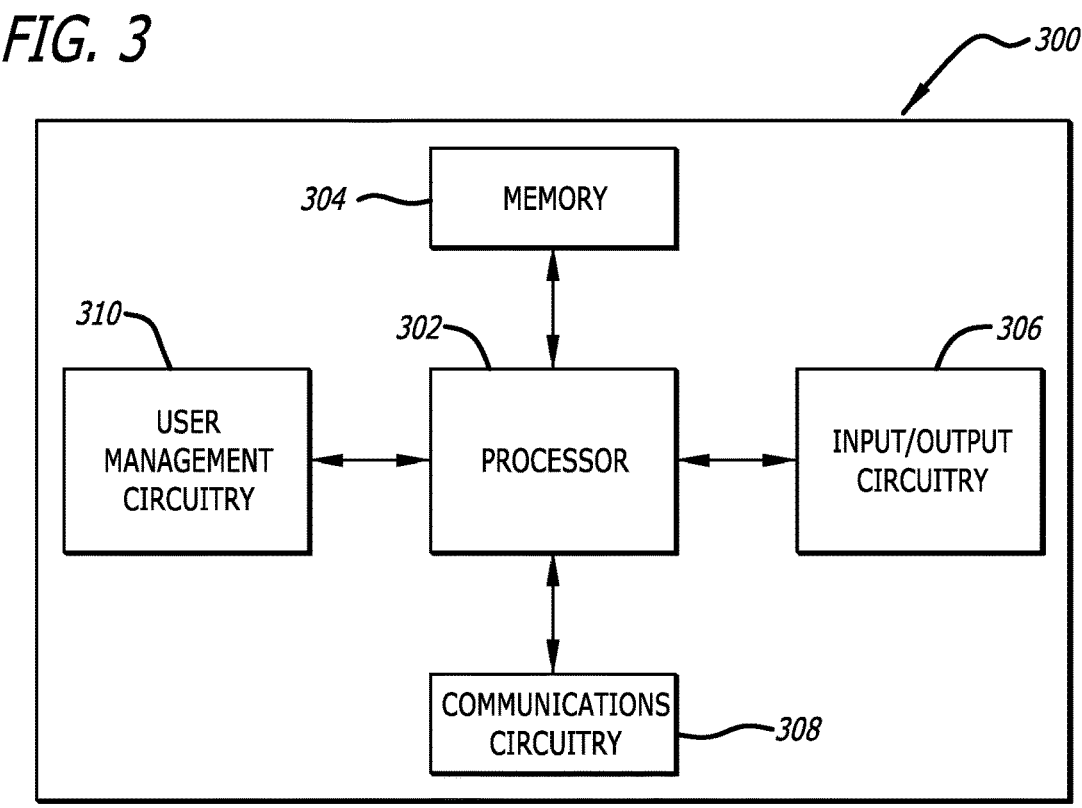

FIG. 3 provides a block diagram of an example apparatus embodying user computing device that may be specially configured in accordance with at least one example embodiment of the present invention.

Figure 4:
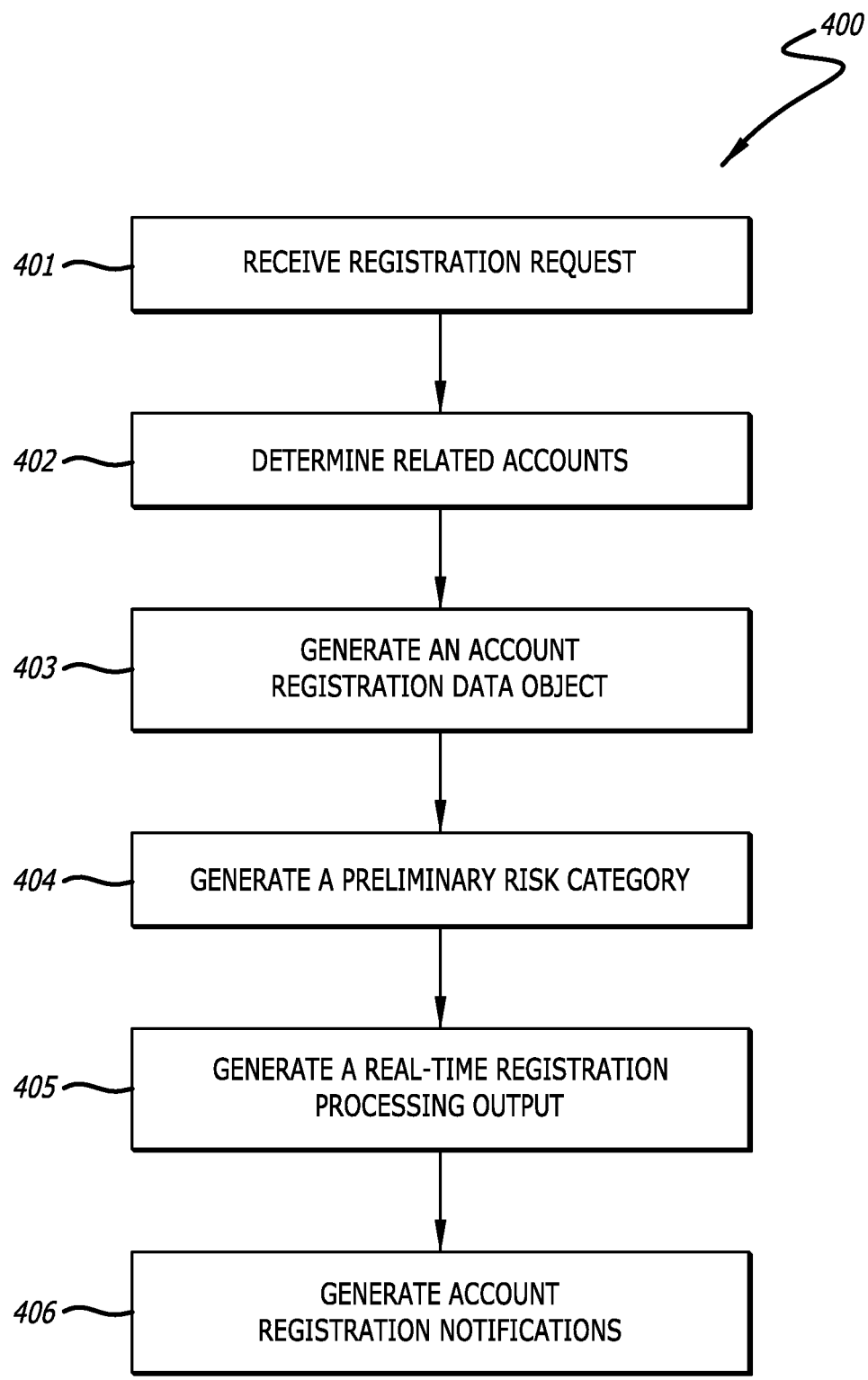

FIG. 4 provides a flowchart diagram of an example process for managing an account registration session using real-time risk scoring and cross-account inferences in accordance with at least one example embodiment of the present invention.

Figure 5:
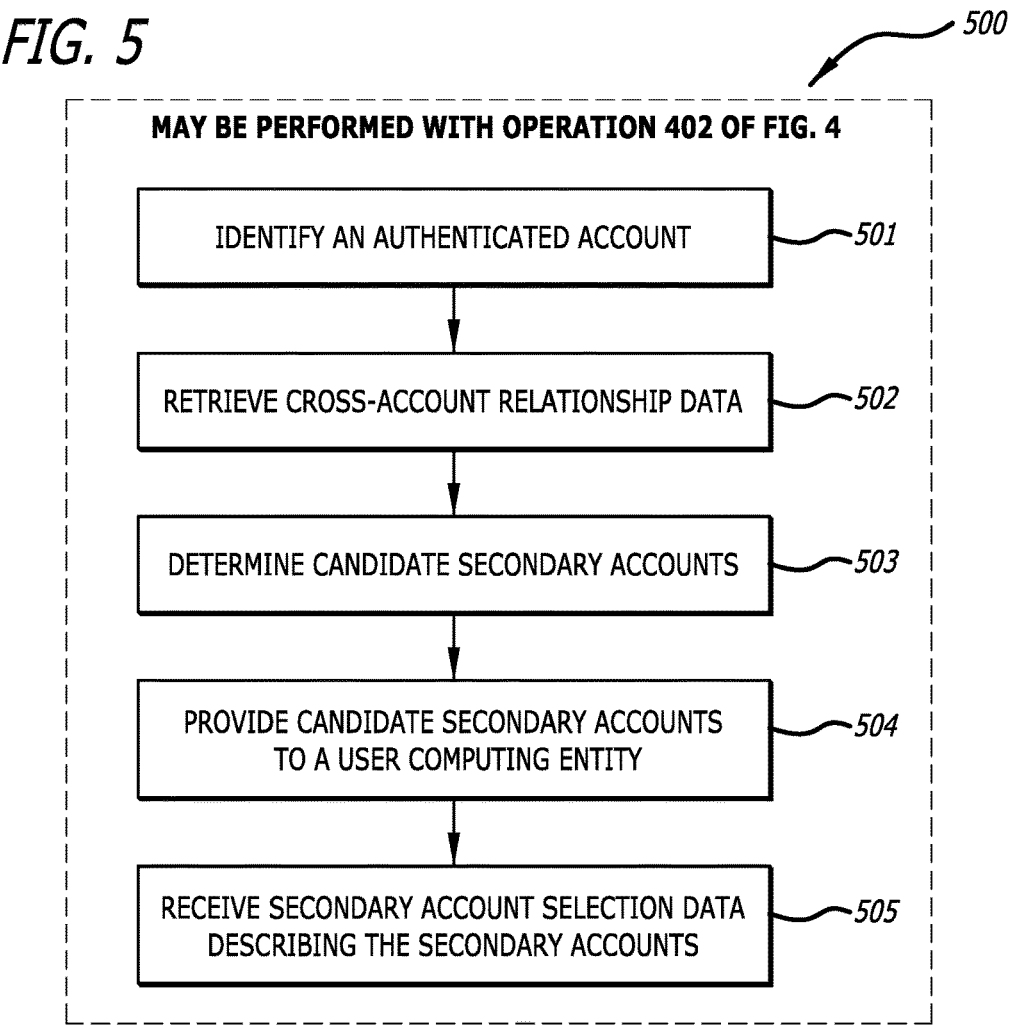

FIG. 5 provides a flowchart diagram of an example process for determining related accounts for a registration request in accordance with at least one example embodiment of the present invention.

Figure 6:
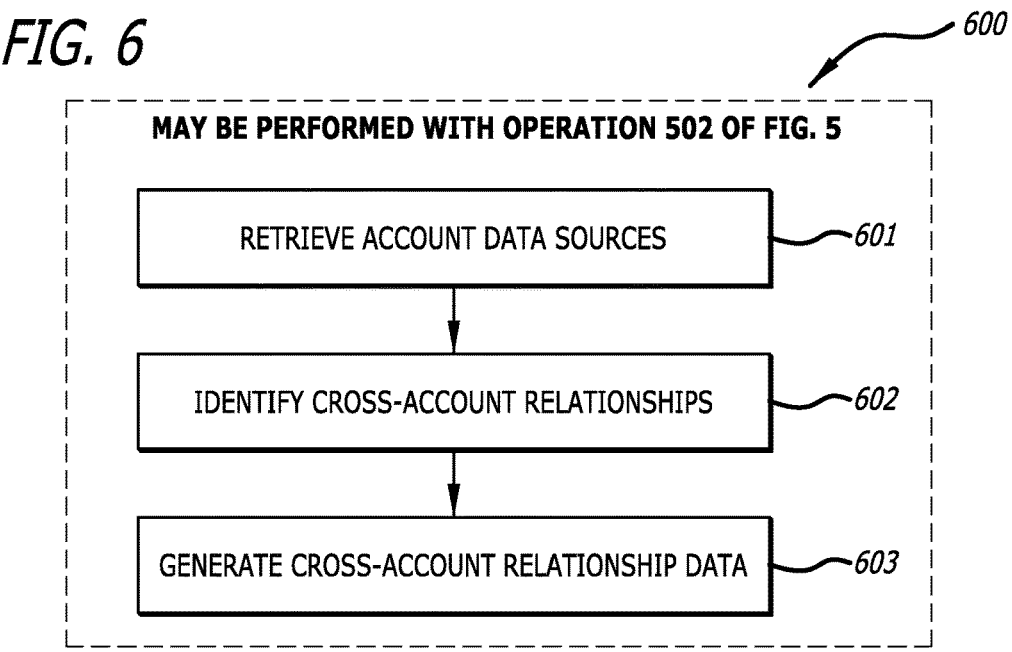

FIG. 6 provides a flowchart diagram of an example process for generating cross-account relationship data for a set of registered accounts of an electronic platform in accordance with at least one example embodiment of the present invention.

Figure 7:
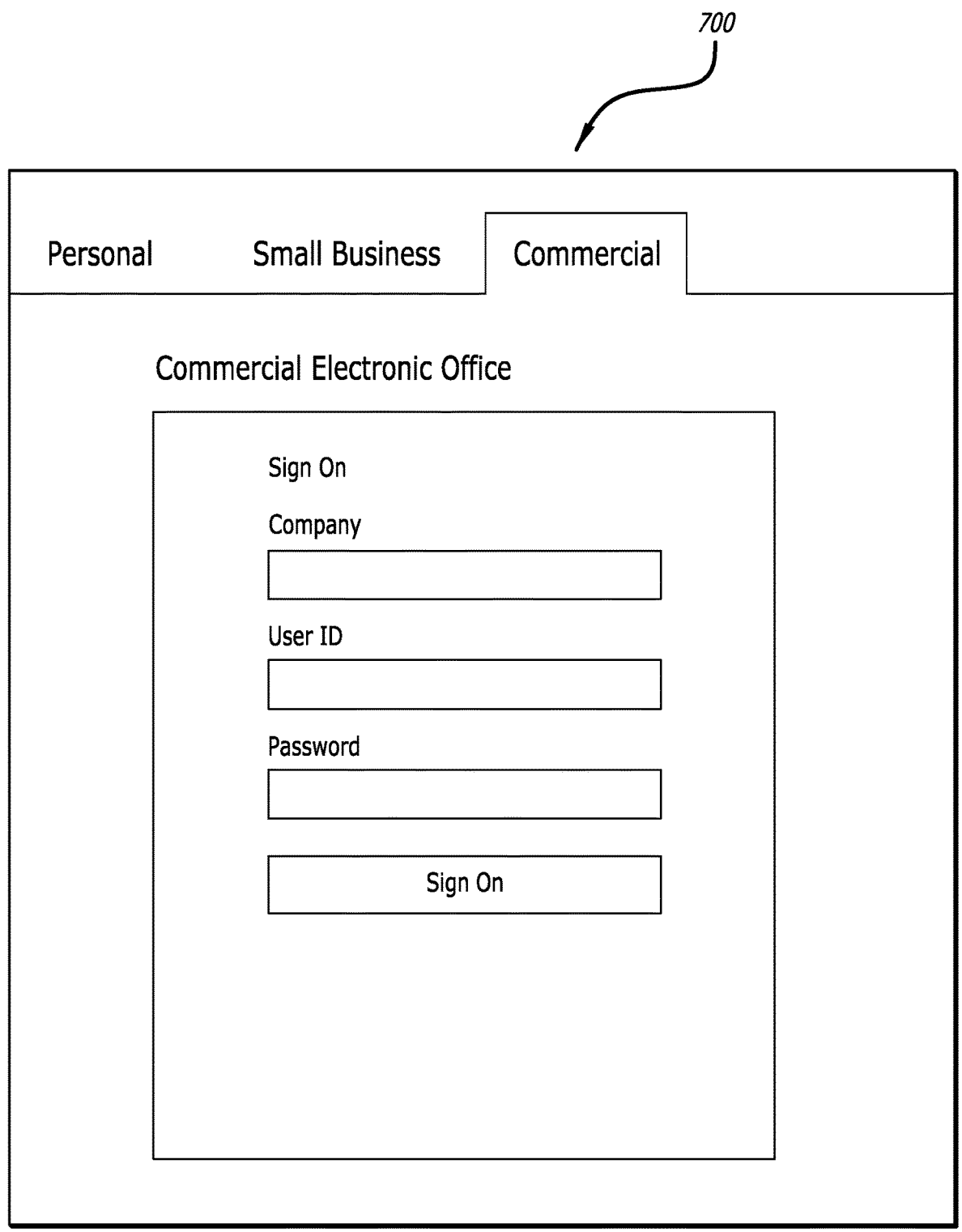

FIG. 7 provides an operational example of a user login user interface in accordance with at least one example embodiment of the present invention.

Figure 8:
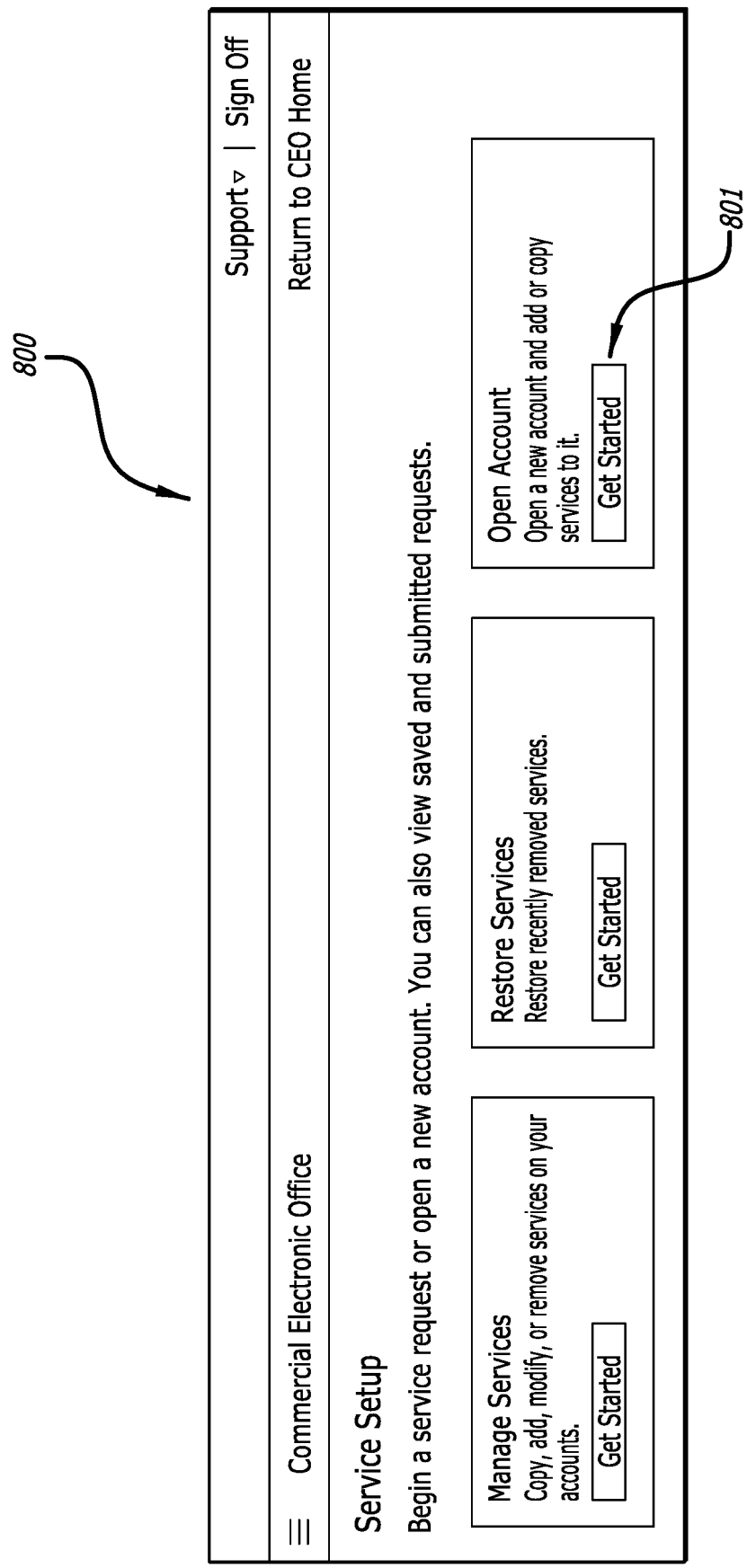

FIG. 8 provides an operational example of an activity management homepage user interface in accordance with at least one example embodiment of the present invention.

FIG. 9 provides an operational example of a cross-account inference management user interface in accordance with at least one example embodiment of the present invention.

FIG. 10 provides an operational example of a secondary account selection user interface in accordance with at least one example embodiment of the present invention.

FIG. 11 provides an operational example of a cross-account inference management user interface in accordance with at least one example embodiment of the present invention.

FIG. 12 provides an operational example of an imported input data field display user interface in accordance with at least one example embodiment of the present invention.

Figure 13:
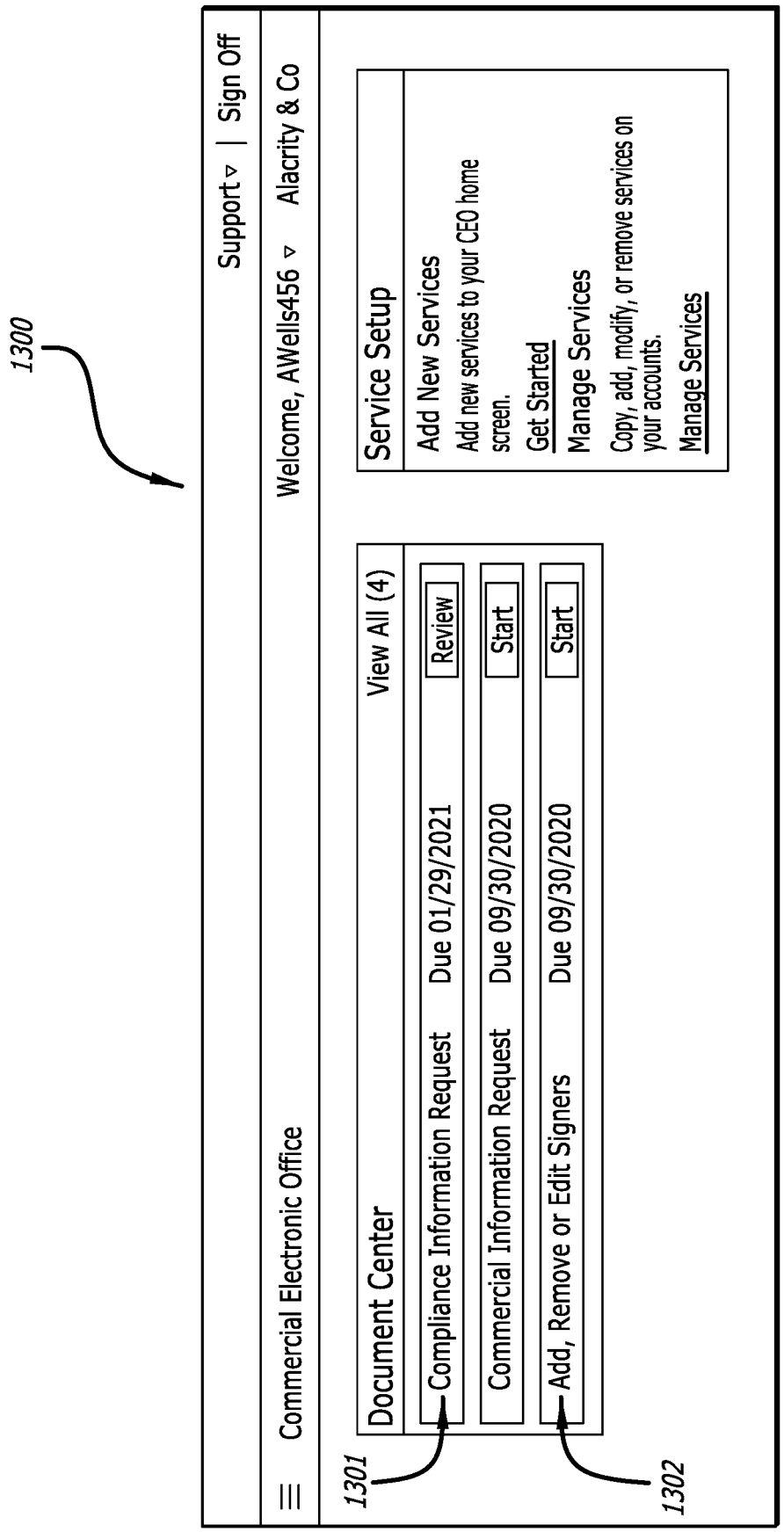

FIG. 13 provides an operational example of an account registration status display user interface in accordance with at least one example embodiment of the present invention.

Figure 14:
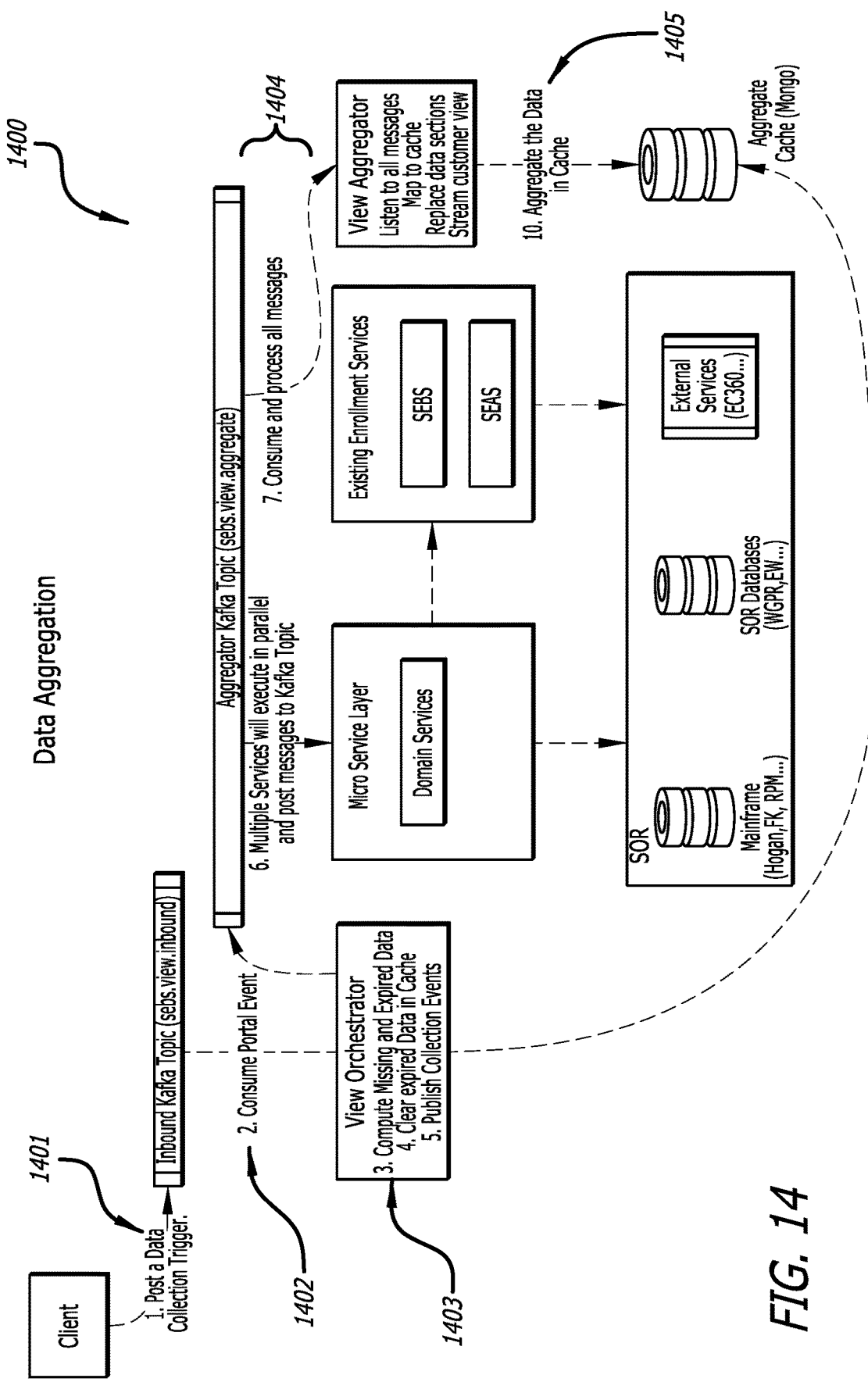

FIG. 14 provides an operational example of a data aggregation workflow in accordance with at least one example embodiment of the present invention.

DETAILED DESCRIPTION

Embodiments of the present invention now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview and Technical Advantages

Various embodiments of the present invention describe techniques that perform account registration management operations with respect to an account registration session based on a real-time registration processing output that is generated based on an earlier-generated preliminary risk category, such as a preliminary risk category that is generated before the account registration session is completed. Conventionally, account registration session procedures may require manual entering of information by one or more users, even if the corresponding institution already has this information stored as associated with a different account. Such requirements for users to enter redundant information may increase associated user friction, which may cause the user to delay or ultimately abandon the opening of the associated account. These situations may be avoided by leveraging the existing information that may exist in account associated with the user.

To address the above-noted technical challenges, various embodiments of the present invention describe an account registration management system configured to generate a component of a real-time registration processing output during the account registration session. As such, the disclosed techniques enable reducing the data processing time associated with generating the real-time registration processing output, thus increasing the speed and operational reliability of an electronic data management system that is configured to perform account registration management operations.

In some embodiments, the account registration management system may further increase speed and operational reliability of the electronic data management system that is configured to perform account registration management operations by performing parallel processing operations. For example, during an account registration session that is triggered by a particular registration request, after identifying the related accounts for the particular registration request and generating the account registration data object for the particular registration request, the electronic data management system may concurrently (e.g., using two separate processes/threads performed on the same computing entity or using two computing entities that execute using a parallel processing arrangement): (i) enable the user to provide input data values to complete the missing input fields of the account registration data object and/or to change the pre-populated input fields of the account registration data object, and (ii) generate a preliminary risk category based on risk determination input data. In some of the noted embodiments, this concurrent processing enables the electronic data management system to generate a real-time registration processing output for the particular registration request during or shortly after the account registration session, which in turn enables generating account registration notifications during or shortly after the account registration session. In some embodiments, generating the one or more confirmatory request notifications and at least one of (i) generating the account registration data object or (ii) generating the real-time registration processing output occur concurrently.

An example application of various embodiments of the present invention relates to managing an account registration session related to registering for a new financial services delivery account.

Definition of Certain Terms

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly describe herein are also contemplated as may be set forth in some of the appended claims. Although specific terms are employed herein, they are used in a generic and descriptive sense only and not for purposes of limitation.

The terms "data," "content," "information," "electronic information," "signal," "command," and similar terms may be used interchangeably to refer to data capable of being transmitted, received, and/or stored in accordance with embodiments of the present invention. Thus, use of any such terms should not be taken to limit the spirit or scope of embodiments of the present invention. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The terms "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The terms "in one embodiment," "according to one embodiment," "in some embodiments," and the like generally may refer to the fact that the particular feature, structure, or characteristic following the phrase may be included in at least one embodiment of the present invention. Thus, the particular feature, structure, or characteristic may be included in more than one embodiment of the present invention such that these phrases do not necessarily refer to the same embodiment.

The term "example" is used herein to mean "serving as an example, instance, or illustration." Any implementation described herein as "example" is not necessarily to be construed as preferred or advantageous over other implementations.

The terms "computer-readable medium" and "memory" refer to non-transitory storage hardware, non-transitory storage device or non-transitory computer system memory that may store computer-executable instructions or software programs that may be accessed by a controller, a microcontroller, a computational system or a module of a computational system. A non-transitory computer-readable medium may be accessed by a computational system or a module of a computational system to retrieve and/or execute the computer-executable instructions or software programs stored on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" may refer to any computer embodied in hardware, software, firmware, and/or any combination thereof. Non-limiting examples of computing devices include a personal computer, a server, a laptop, a mobile device, a smartphone, a fixed terminal, a personal digital assistant ("PDA"), a kiosk, a custom-hardware device, a wearable device, a smart home device, an Internet-of-Things ("IoT") enabled device, and a network-linked computing device.

The term "user" may refer to any entity utilizing a computing device. Non-limiting examples of a user include a human operator, automatic executing software, and a business entity operating through one or more agent(s).

The term "registration request" may refer to a request by a registered user of an electronic data management system to create and/or generate a new account corresponding to a new requested service and/or a new requested product. For example, the registration request may be a request by a registered user of an electronic financial services delivery platform associated with the electronic data management system to enable the registered user to access a particular financial service (e.g., a particular credit extension program, a particular securities management tool, a particular letter of credit approval program, and/or the like) provided by the financial institution that is associated with the financial services delivery platform. In some embodiments, the registration request is associated with a requested account type, where the requested account type may describe a particular service requested by the registration request. As described above, when the registration request is processed by an electronic financial services delivery platform, the registration request may be associated with a particular financial service provided by the financial institution. In some of the noted embodiments, the requested account type of the registration request is determined based on the particular financial service that is associated with the registration request. Accordingly, examples of requested account types associated with a registration request that is processed by an electronic financial services delivery platform include at least one of a requested account type that describes a particular credit extension program, a requested account type that describes a particular securities management tool, a requested account type that describes a particular letter of credit approval program, and/or the like.

The term "related account" may refer to an existing account of an electronic data management system, such as an existing account of an electronic financial services delivery platform that is provided by the electronic data management system. In some embodiments, the related user accounts for a registration request include at least one of one or more authenticated accounts associated with the registration request and one or more secondary accounts associated with the registration request.

The term "authenticated account" may refer to an existing account of an electronic data management system that is associated with the authenticated credentials received via a registration request, such that the authenticated credentials enable the user associated with the registration request to access the authenticated account. For example, in some embodiments, when a registered user profile of an electronic financial services delivery platform logs into the electronic financial services delivery platform by providing a set of authenticated credentials to the electronic financial services delivery platform, all of the registered accounts of the electronic financial services platform that are associated with the authenticated credentials and thus can be accessed via the resulting login session are deemed authenticated accounts for the corresponding registration request.

The term "secondary account" may refer to an existing account of an electronic data management system that is not an authenticated account for a registration request (i.e. that is not associated with the authenticated credentials provided via the registration request), but that is associated with an authenticated account for the registration request via cross-account inferences performed based on cross-account relationship data associated with the electronic data management system. An example of a secondary account for a registration request is an account that is determined to be associated with an authenticated account for the registration request based on internal cross-account relationship data associated with (e.g., maintained by) the electronic data management system and/or based on external cross-account relationship data maintained by a third-party application programming interface (API) that is configured to interact with the electronic data management system and provide API response data describing cross-account relationships of a particular entity (e.g., a particular individual as described by an individual identifier number such as a social security number, a particular company as described by company identifier data, and/or the like), where the particular entity is associated with the particular authenticated account.

The term "account registration data object" may refer to a set of input fields associated with the registered account type of the registration request, where some of the input fields are automatically populated with corresponding values associated with the related accounts for the user that is associated with the registration request. An example of an input field is an input account data field (e.g., an input account data field that describes a demographic feature of the user associated with the registration request) and/or an input account setting data field (e.g., an input account data field that describes wire transfer data for the registration request). In some embodiments, after identifying the related accounts for a registration request that is associated with a requested account type, an electronic data management system: (i) identifies the input data fields that are required and/or that are relevant (e.g., that can be optionally provided) as part of an account registration session that is configured to create a new account corresponding to the requested account type, (ii) for each input data field, determines account data and/or setting data associated with whether at least one related account for the corresponding registration request describes a value corresponding to the input data field, and (iii) generates an account registration data object that describes the values identified in operation (ii) as automatically populated values that can be changed by the user.

The term "preliminary risk category" may refer to an inferred/predicted risk determination for a corresponding registration request that is generated by an electronic data management system during an account registration session associated with the corresponding registration request. In some embodiments, during an account registration session that is triggered by a particular registration request, after identifying the related accounts for the particular registration request and generating the account registration data object for the particular registration request, the electronic data management system concurrently (e.g., using two separate processes/threads performed on the same computing entity or using two computing entities that execute using a parallel processing arrangement): (i) enables the user to provide input data values to complete the missing input fields of the account registration data object and/or to change the pre-populated input fields of the account registration data object, and (ii) generates a preliminary risk category based on risk determination input data, such as risk determination input data determined based on the pre-populated fields of the account registration data object and/or based on feature data (e.g., historical activity feature data) associated with the related accounts for the particular registration request. In some of the noted embodiments, this concurrent processing enables the electronic data management system enables the electronic data management system to generate a real-time registration processing output for the particular registration request during or shortly after the account registration session, which in turn enables generating account registration notifications during or shortly after the account registration session. In some embodiments, generating the one or more confirmatory request notifications and at least one of (i) generating the account registration data object or (ii) generating the real-time registration processing output occur concurrently.

The term "risk scoring machine learning model" may refer to a machine learning model that is configured to process risk determination input data associated with a particular registration request to generate the preliminary risk category for the particular registration request. In some embodiments, the risk determination input data associated with the particular registration request include feature data associated with related accounts of the particular registration and/or feature data determined based on automatically populated fields of the registration data object that is associated with the particular registration request. Examples of risk determination input data include at least one of: (i) a risk determination input data field describing whether at least one related account of the particular registration request has successfully passed (i.e., satisfied the requirements of) a particular risk determination check (e.g., a particular background check, a particular credit check, and/or the like), (ii) a risk determination input data field describing a pre-existing risk score (e.g., a credit score) that is associated with the related accounts of the particular registration request, (iii) a risk determination input field describing account ages of the related accounts of the particular registration request, and/or the like. An example of a risk scoring machine learning model is a neural network machine learning model that is trained based on ground-truth risk categories for particular account holders (e.g., ground-truth risk categories determined based on historical activity patterns associated with the particular account holders). In some of the noted embodiments, the neural network machine learning model may be trained using a training routine that comprises an optimization mechanism for optimizing a loss model (e.g., optimizing a loss model using a local optimization technique such as using a gradient-descent-based) as well as a mechanism for propagating loss model optimizations across various layers of the neural network machine learning model (e.g., using a backpropagation mechanism that propagates a gradient of the loss model in a reverse order across the layers of the neural network machine learning model).

The term "real-time registration processing output" may refer to a determination about whether successful processing of a registration request associated with a corresponding account registration session requires any user actions and/or any user-provided data fields, where the noted determination is determined during or shortly after (e.g., within seconds, minutes, hours of, as defined by the service level objectives of the corresponding electronic platform) the corresponding account registration session. In some embodiments, the real-time registration processing output describes particular risk determination data fields for a particular risk determination check are needed to complete processing of the registration request, where the particular risk determination check is the respective risk determination check for the preliminary risk category associated with the registration request. In some embodiments, the real-time registration processing output describes that no risk determination data fields are needed to complete processing of the registration request as the preliminary risk category does not require a respective risk determination check. In some embodiments, the real-time registration processing output describes a need for at least one of: (i) user approval of a particular risk determination check if the preliminary risk determination for the registration request is associated with a respective determination check, or (ii) user approval of the complete processing of the registration request if the preliminary risk determination for the registration request is not associated with a respective determination check.

Example System and System Operations

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides a block diagram of an example system that may be specially configured within which embodiments of the present invention may operate. Specifically, FIG. 1 depicts an example system 100. The example system 100 includes a plurality of computing devices, including user computing devices 104A-104N (collectively "user computing devices 104") and electronic data management system 102. Each of the user computing devices 104 is communicable at least with the electronic data management system 102 over one or more communication networks. For example, as depicted, each of the user computing devices 104 is communicable with the electronic data management system 102 over a first communication network 106.

In at least one example context, each of the user computing devices 104 embodies a computing device controlled by a particular user. Non-limiting examples of such user computing devices 104 include a user's mobile device (e.g., smartphone), tablet, personal computer, and/or the like. It should be appreciated that a particular user may control and/or otherwise be associated with any number of user computing devices. For example, as illustrated, user computing devices 104A and 104B are each associated with User A. In an example context, user computing device 104A embodies a smartphone owned, operated, and/or otherwise controlled by the User A, and user computing device 104B embodies a personal computer owned, operated, and/or otherwise controlled by the User A. Various capabilities may be performable by any of the user devices, such as image capture capabilities, video capabilities, audio recording capabilities, teleconferencing capabilities, user-drawing capabilities, specialized peripheral capabilities, and/or the like.

The electronic data management system 102 includes hardware, software, and/or firmware for providing functionality associated with any of a number of electronic data objects, transaction processing operations, and/or the like. In some embodiments, the electronic data management system 102 is embodied by one or more server(s) and/or one or more database(s) configured to provide functionality to create, maintain, and/or otherwise process electronic data objects and/or associated transactions. In one example context, for example, the electronic data management system 102 comprises one or more server(s) and/or one or more database(s) associated with a financial institution that enables storage and/or associated maintenance of financial data objects (e.g., accounts, loan applications, mortgage applications, and/or the like), and//or enables performing operations associated with stored financial data objects. For example, in one such example context, the electronic data management system 102 enables multiple users to access functionality associated with completing a particular electronic data object, such as a multi-user loan application that requires multiple user transactions, such as a plurality of user-submitted electronic authorizations, before the application is successfully processed. In some embodiments, the electronic data management system 102 is remote from each of the user computing devices 104, and may be controlled by and/or otherwise associated with a different entity than those that control each of the user computing devices 104 (e.g., a particular business, financial institution, and/or the like). It should be appreciated that in some other contexts, the electronic data management system 102 embodies any other of a number of processing server(s) and/or database(s) that provides functionality for user by one or more users provisioned to access the electronic data management system 102.

In some embodiments, a computing device communicates with one or more other computing devices via a connection channel established with the other computing device(s). In some such embodiments, a computing device establishes a connection channel by performing an authentication process with the other computing device with which the connection channel is to be established. For example, in at least one example context, a computing device desiring to establish a connection channel with an electronic data management system 102, or other computing device, provides and/or otherwise communicates user authentication credentials to the electronic data management system 102 so that such user authentication credentials may be utilized to authenticate the user and/or associate the computing device accessed by the user with a particular user data object provisioned via the electronic data management system 102. Additionally or alternatively, in other embodiments, a computing device establishes a connection channel with another computing device without authentication, such as simply by requesting such a connection channel be established through a request transmission to the other computing device. Additionally or alternatively still, in other embodiments, one or more connection channel(s) are configured such that no additional user action is required to establish the connection channel.

Example Apparatuses

The methods, apparatuses, systems, and computer program products of the present invention may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In at least one example embodiment, the electronic data object management system 102 is embodied by one or more computing systems, such as the apparatus 200 as shown in FIG. 2. The apparatus 200 may include a processor, memory 204, input/output circuitry 206, communications circuitry 208, and electronic data management circuitry 210. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus 200 should therefore be understood to include particular hardware configured to perform the functions associated with the particular set of circuitry as described herein.

Additionally or alternatively, the term "circuitry" should be understood broadly to include hardware and, in some embodiments, software and/or firmware for configuring the hardware. For example, in some embodiments, "circuitry" may include processing circuitry, storage media, network interfaces, input/output devices, and the like. In some embodiments, other elements of the apparatus 200 may provide or supplement the functionality of the particular circuitry. For example, the processor 202 may provide processing functionality, the memory 204 may provide storage functionality, the communications circuitry 208 may provide network interface functionality, and the like, to one or more of the other sets of circuitry.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present invention. In some embodiments, for example, the memory 204 embodies one or more databases for storing user data objects, electronic data objects, and/or other data associated therewith, and/or otherwise is configured to maintain such data objects for accessing and/or updating as described herein.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

As one example context, the processor 202 is configured to provide functionality associated with accessing and/or processing electronic data object(s) maintained by the apparatus 200. In some such embodiments, such functionality includes generating new electronic data object(s), storing electronic data object(s), updating electronic data object(s), updating action status values(s) associated with processing action(s) to be performed for one or more electronic data object(s), performing processing actions associated with one or more electronic data object(s), and/or the like.

In some embodiments, the apparatus 200 may include input/output circuitry 206 that may, in turn, be in communication with processor 202 to provide output to the user and, in some embodiments, to receive an indication of a user input. The input/output circuitry 206 may comprise one or more user interfaces, and may include a display to which user interface(s) may be rendered. In some embodiments, the input/output circuitry 206 may comprise a web user interface, a mobile application, a desktop application, a linked or networked client device, and/or the like. In some embodiments, the input/output circuitry 206 may also include a keyboard, a mouse, a joystick, a touch screen, touch areas, soft keys, a microphone, a speaker, or other input/output mechanisms. In some such embodiments, the input/output mechanisms are configured to enable a user to provide data representing one or more user interaction(s) for processing by the apparatus 200. The processor and/or user interface circuitry comprising the processor, for example processor 202, may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, at least a network interface for enabling communications with a wired or wireless communications network. For example, the communications circuitry 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The electronic data management circuitry 210 includes hardware, software, firmware, and/or a combination thereof, configured to support electronic data object management functionality associated with the electronic data management system 102. The electronic data management circuitry 210 may utilize processing circuitry, such as the processor 202, to perform one or more of these actions. In some embodiments, the electronic data management circuitry 210 includes hardware, software, firmware, and/or a combination thereof, to generate and/or store new electronic data object(s). Additionally or alternatively, in some embodiments, the electronic data management circuitry 210 includes hardware, software, firmware, and/or a combination thereof, to perform one or more processing actions associated with an electronic data object. Non-limiting examples of a processing action include performing an electronic authorization action(s) associated with one or more user data object(s). Additionally or alternatively, in some embodiments, the electronic data management circuitry 210 includes hardware, software, firmware, and/or a combination thereof, to identify specific functionality accessible by one or more connection channel(s) for particular user data object(s), and/or provide access to such specific functionality. Additionally or alternatively, in some embodiments, the electronic data management circuitry 210 includes hardware, software, firmware, and/or a combination thereof, to maintain and/or update one or more database(s) including user data object(s), electronic data object(s), and/or the like in response to user interaction via one or more connection channel(s). It should be appreciated that, in some embodiments, the electronic data management circuitry 210 may include a separate processor, specially configured field programmable gate array (FPGA), or a specially configured application-specific integrated circuit (ASIC).

In at least one example embodiment, a user computing device, such as one of the user computing devices 104 is embodied by one or more computing systems, such as the apparatus 300 as shown in FIG. 3. The apparatus 300 may include a processor 302, memory 304, input/output circuitry 306, communications circuitry 308, and/or the user management circuitry 310. Each of the similarly named components 302-308, in some embodiments, function in a manner similar to that described herein with respect to the similarly named components in FIG. 2.

The user management circuitry 310 includes hardware, software, firmware, and/or a combination thereof, configured to support functionality for interaction with an electronic data management system, such as the electronic data management system 102, by a user computing device, such as one of the user computing devices 104. Additionally or alternatively, in some embodiments, the user management circuitry 310 includes software, hardware, firmware, and/or a combination thereof, to execute an application (e.g., a web-based or native application) provided by the electronic data management system for accessing such functionality. Additionally or alternatively still, in some embodiments, the user management circuitry 310 includes hardware, software, firmware, and/or a combination thereof, to cause rendering of one or more user interface(s) comprising various interface element(s) providing access to functionality via the electronic data management system, and/or updating one or more user interfaces to include updated interface element(s) to provide access to updated functionality via the electronic data management system, alert(s) indicating various determinations and/or statuses of access to functionality and/or the connection channel, and/or the like. It should be appreciated that, in some embodiments, the user management circuitry 310 may include a separate processor, specially configured field programmable gate array (FPGA), or a specially configured application-specific integrated circuit (ASIC).

Exemplary System Operations

Various embodiments of the present invention describe techniques that perform account registration management operations with respect to an account registration session based on a real-time registration processing output that is generated based on an earlier-generated preliminary risk category, such as a preliminary risk category that is generated before the account registration session is completed. In some embodiments, the preliminary risk category is generated based related accounts for an account registration session as determined based on cross-account relationship data for an electronic data management system that is configured to perform account registration management operations, where the cross-account relationship data may be generated using a set of cross-account relationship aggregation data operations, such as the set of cross-account relationship aggregation data operations described herein.

However, a person of ordinary skill in the relevant technology will recognize that, in some embodiments, cross-account relationship data may be generated using techniques other than the cross-account relationship aggregation data techniques described herein. Furthermore, a person of ordinary skill in the relevant technology will recognize that cross-account relationship data generated in accordance with the techniques described herein may be used to perform tasks in addition to or instead of account registration session management operations described herein. Moreover, a person of ordinary skill in the relevant technology will recognize that, in some embodiments, a first computing entity may be configured to perform data aggregation operations configured to generate cross-account relationship data, while a second and different computing entity may be configured to perform account registration session management operations configured to manage account registration sessions.

Account Registration Request Management Operations

FIG. 4 is a flowchart diagram of an example process 400 for managing an account registration session using real-time risk scoring and cross-account inferences. Via the various operations of the process 400, the electronic data management system 102 can perform account registration management operations with respect to an account registration session based on a real-time registration processing output that is generated based on an earlier-generated preliminary risk category, such as a preliminary risk category that is generated before the account registration session is completed. In some embodiments, by generating a component of the real-time registration processing output during the account registration session, the process 400 enables reducing the data processing time associated with generating the real-time registration processing output, thus increasing the speed and operational reliability of the electronic data management system 102.

The process 400 begins at operation 401 when the electronic data management system 102 receives a registration request. In some embodiments, a registration request is a request by a registered user of the electronic data management system 102 to create and/or generate a new account corresponding to a new requested service and/or a new requested product. For example, the registration request may be a request by a registered user of an electronic financial services delivery platform associated with the electronic data management system 102 to enable the registered user to access a particular financial service (e.g., a particular credit extension program, a particular securities management tool, a particular letter of credit approval program, and/or the like) provided by the financial institution that is associated with the financial services delivery platform. For example, a registered user may be an institution employee or a user of the electronic financial platform.

In some embodiments, the registration request is associated with a requested account type, where the requested account type may describe a particular service requested by the registration request. As described above, when the registration request is processed by an electronic financial services delivery platform, the registration request may be associated with a particular financial service provided by the financial institution. In some of the noted embodiments, the requested account type of the registration request is determined based on the particular financial service that is associated with the registration request. Accordingly, examples of requested account types associated with a registration request that is processed by an electronic financial services delivery platform include at least one of a requested account type that describes a particular credit extension program, a requested account type that describes a particular securities management tool, a requested account type that describes a particular letter of credit approval program, and/or the like.

In some embodiments, the registration request is associated with a registered user of the electronic platform provided by the electronic data management system 102 that is configured to receive and process the registration request. An example of a registered user is a registered user of an electronic service delivery platform, such as a registered user of an electronic financial services delivery platform that is associated with a financial institution. In some embodiments, a registered user is recognized by an electronic platform when a user computing device provides one or more authenticated credentials (e.g., the combination of a username and a password, the combination of a username, a password, and a personal identification number (PIN), the combination of a username, a password, and a two-factor authentication code, and/or the like) of a registered user profile of the electronic platform to the electronic platform. In some embodiments, a user computing device provides the authenticated credentials of the registered user profile in response to input instructions provided by the end user of the user computing device, such as input instructions comprising a click on a submission button after entering input data into input-receiving user interface elements that are configured to receive authenticated credentials, or input instructions comprising providing a fingerprint authorization to provide pre-stored authentication credentials to the electronic platform. In some embodiments, the authenticated credentials are associated with either the user or an institution associated with the user.

At operation 402, the electronic data management system 102 determines a plurality of related accounts associated with the user. A related account may be an existing account of the electronic data management system 102, such as an existing account of an electronic financial services delivery platform that is provided by the electronic data management system 102. In some embodiments, the related user accounts for a registration request include at least one of one or more authenticated accounts associated with the registration request and one or more secondary accounts associated with the registration request.

In some embodiments, an authenticated account for a registration request is an existing account of the electronic data management system 102 that is associated with the authenticated credentials received via the registration request, such that the authenticated credentials enable the user associated with the registration request to access the authenticated account. For example, in some embodiments, when a registered user profile of an electronic financial services delivery platform logs into the electronic financial services delivery platform by providing a set of authenticated credentials to the electronic financial services delivery platform, all of the registered accounts of the electronic financial services platform that are associated with the authenticated credentials and thus can be accessed via the resulting login session are deemed authenticated accounts for the corresponding registration request.

In some embodiments, a secondary account for a registration request is an existing account of the electronic data management system 102 that is not an authenticated account for the registration request (i.e. that is not associated with the authenticated credentials provided via the registration request), but that is associated with an authenticated account for the registration request via cross-account inferences performed based on cross-account relationship data associated with the electronic data management system 102. An example of a secondary account for a registration request is an account that is determined to be associated with an authenticated account for the registration request based on internal cross-account relationship data associated with (e.g., maintained by) the electronic data management system 102 and/or based on external cross-account relationship data maintained by a third-party application programming interface (API) that is configured to interact with the electronic data management system 102 and provide API response data describing cross-account relationships of a particular entity (e.g., a particular individual as described by an individual identifier number such as a social security number, a particular company as described by company identifier data, and/or the like), where the particular entity is associated with the particular authenticated account.

In some embodiments, operation 402 may be performed in accordance with the process 500 that is depicted in FIG. 5, which is an example process for determining related accounts for a registration request. The process 500 begins at operation 501 when the electronic data management system 102 identifies an authenticated account for the registration account. As described above, the authenticated account may be identified based on authenticated credentials provided to an electronic platform associated with the electronic data management system 102 by a user computing device. In some of the noted embodiments, the authenticated credentials may be provided by an end user of the user computing device via a user login user interface displayed by the user computing device, such as the user login user interface 700 of FIG. 7.

At operation 502, the electronic data management system 102 retrieves cross-account relationship data describing cross-account relationships between registered accounts of the electronic data management system 102. As described above, in some embodiments, the related accounts for a registration request include one or more secondary accounts that are determined based on cross-account relationship data associated with the electronic data management system 102. In some embodiments, the cross-account relationship data may be generated via the operations of the process 600 of FIG. 6, as further described below. However, a person of ordinary skill in the relevant technology will recognize that, in some embodiments, cross-account relationship data may be generated using techniques other than the techniques described herein with reference to FIG. 6. Moreover, while the process 600 is described herein as being performed by the same computing entity as the computing entity that is configured to manage the account registration session (i.e., by the electronic data management system 102), a person of ordinary skill in the relevant technology will recognize that, in some embodiments, a first computing entity may be configured to perform data aggregation operations configured to generate cross-account relationship data, while a second and different computing entity may be configured to perform account registration session management operations configured to manage account registration sessions.

At operation 503, the electronic data management system 102 determines, based on the cross-account relationship data, one or more candidate secondary accounts for the authenticated account. A candidate secondary account may be a registered account of the electronic data management system 102 that is recorded to be related to the authenticated account such that the two registered accounts are deemed to be associated with the same account holder entity and/or are deemed to be associated with a set of common input fields (e.g., a set of common input account data fields and/or a set of common input account setting data fields). To map the relationship between related accounts, the electronic management system 102 may determine a cross-account relationship data object, which defines the relationship between each of the one or more related accounts.

In some embodiments, the cross-account relationship data is stored in a graph format and as a cross-account relationship graph data object (e.g., a cross-account relationship data object in graph format) with one or more account nodes. A candidate related account for an authenticated account may be a registered account whose respective account nodes in the cross-account relationship graph data object has a common edge with the respective account node of the authenticated account, thereby forming a group of account nodes. In some embodiments, when the cross-account relationship data is stored in a graph format and as a cross-account relationship graph data object, then a candidate related account for an authenticated account may be a registered account whose respective account node in the cross-account relationship graph data object is within N traversal hops (i.e., within N edges) of the respective account node of the authenticated account, where N may be a preconfigured value that is determined based on the requested account type of the corresponding account registration request.

At operation 504, the electronic data management system 102 provides the candidate secondary accounts to the user computing device that is associated with the registration request. In some of the noted embodiments, the user computing device is then configured to provide the candidate secondary accounts to an end user of the user computing device via a secondary account selection user interface that enables the end user to select which candidate secondary accounts should be classified as secondary accounts. Then, the user computing device is configured to provide secondary account selection data describing secondary account selections provided by the end user via interacting with the secondary account selection user interface to the electronic data management system 102.

An operational example of a secondary account selection user interface 1000 is depicted in FIG. 10. In the operational example of FIG. 10, the secondary account selection user interface 1000 is displayed after the end user of the user computing device: (i) selects the "Open Account" button 801 in the activity management homepage user interface 800 of FIG. 8, which then displays the cross-account inference management user interface 900 of FIG. 9, and (ii) selects, via the toggle button 901 and the secondary account addition button 902 of the cross-account inference management user interface 900 of FIG. 9, to display the secondary account selection user interface 1000. Once displayed, the secondary account selection user interface 1000 displays a set of candidate secondary accounts for the registration request, such as the candidate secondary account 1001 and the candidate secondary account 1002 and enables selection of a subset of the candidate secondary accounts as the secondary accounts for the registration request.

Returning to FIG. 5, at operation 505, the electronic management system 102 receives the secondary account selection data describing the secondary accounts. As described above, in some embodiments, in response to receiving the candidate secondary accounts from the electronic data management system 102, the user computing device is then configured to provide the candidate secondary accounts to an end user of the user computing device via a secondary account selection user interface that enables the end user to select which candidate secondary accounts should be classified as secondary accounts. Then, the user computing device is configured to provide secondary account selection data describing secondary account selections provided by the end user via interacting with the secondary account selection user interface to the electronic data management system 102.

Returning to FIG. 4, at operation 403, the electronic data management system 102 generates an account registration data object for the registration request based on the related accounts for the registration request. In some embodiments, an account registration data object describes a set of input fields associated with the registered account type of the registration request, where some of the input fields are automatically populated with corresponding values associated with the related accounts for the user that is associated with the registration request. An example of an input field is an input account data field (e.g., an input account data field that describes a demographic feature of the user associated with the registration request) and/or an input account setting data field (e.g., an input account data field that describes wire transfer data for the registration request). In some embodiments, after identifying the related accounts for a registration request that is associated with a requested account type, the electronic data management system 102: (i) identifies the input data fields that are required and/or that are relevant (e.g., that can be optionally provided) as part of an account registration session that is configured to create a new account corresponding to the requested account type, (ii) for each input data field, determines account data and/or setting data associated with whether at least one related account for the corresponding registration request describes a value corresponding to the input data field, and (iii) generates an account registration data object that describes the values identified in operation (ii) as automatically populated values that can be changed by the user.

In some embodiments, once an existing account is added as a related account for a registration request, the user computing device enables the end user to select which input fields of the account should be imported into the new account in order to automatically populate fields of the account registration data object. For example, in the cross-account inference management user interface 1100 of FIG. 11, after the user selects the candidate secondary account 1001 as a secondary account (and thus a related account for the registration request), the cross-account inference management user interface 1100 enables the end user to select which input data field category to import into the new account, as well as to view the imported account data fields via the "View Setting" button 1101, which displays the imported input data field display user interface 1200 of FIG. 12.

In some embodiments, generating the automatically populated input data fields of an account registration data object for a particular account registration session comprises determining an aggregated data repository associated with the account registration session, wherein the aggregated data repository comprises account data associated with the plurality of related accounts; determining one or more matching data fields that have corresponding data values in the aggregated data repository for one or more input fields of the account registration data object; and updating the one or more input fields of the account registration data object based on the one or more matching data fields.

Returning to FIG. 4, at operation 404, the electronic data management system 102 generates a preliminary risk category for the registration request. The preliminary risk category may be an inferred/predicted risk determination for a corresponding registration request that is generated by an electronic data management system 102 during an account registration session associated with the corresponding registration request. In some embodiments, during an account registration session that is triggered by a particular registration request, after identifying the related accounts for the particular registration request and generating the account registration data object for the particular registration request, the electronic data management system 102 concurrently (e.g., using two separate processes/threads performed on the same computing entity or using two computing entities that execute using a parallel processing arrangement): (i) enables the user to provide input data values to complete the missing input fields of the account registration data object and/or to change the pre-populated input fields of the account registration data object, and (ii) generates a preliminary risk category based on risk determination input data, such as risk determination input data determined based on the pre-populated fields of the account registration data object and/or based on feature data (e.g., historical activity feature data) associated with the related accounts for the particular registration request. In some of the noted embodiments, this concurrent processing enables the electronic data management system 102 enables the electronic data management system 102 to generate a real-time registration processing output for the particular registration request during or shortly after the account registration session, which in turn enables generating account registration notifications during or shortly after the account registration session. In some embodiments, generating the one or more confirmatory request notifications and at least one of (i) generating the account registration data object or (ii) generating the real-time registration processing output occur concurrently.

In some embodiments, concurrent with generating the preliminary risk category for a registration request, the electronic data management system 102 performs operations that are configured to enable the user to complete the account registration data object. In some of the noted embodiments, performing the noted operations comprises at least one of determining one or more required data fields of the account registration data object which are associated with incomplete values, providing a supplemental data request to a user device, wherein the supplemental data request comprises one or more input request notifications that request user entry of data values corresponding to the one or more required data fields associated with incomplete values, receiving a supplemental data response from the user device, wherein the supplemental data response includes user input corresponding the one or more required data fields associated with the incomplete values, and updating the one or more required data fields of the account registration data object based on the supplemental data response.

In some embodiments, the preliminary risk category for a registration request is generated by a risk scoring machine learning model. In some embodiments, the risk scoring machine learning model is configured to process risk determination input data associated with a particular registration request to generate the preliminary risk category for the particular registration request. In some embodiments, the risk determination input data associated with the particular registration request include feature data associated with related accounts of the particular registration and/or feature data determined based on automatically populated fields of the registration data object that is associated with the particular registration request. Examples of risk determination input data include at least one of: (i) a risk determination input data field describing whether at least one related account of the particular registration request has successfully passed (i.e., satisfied the requirements of) a particular risk determination check (e.g., a particular background check, a particular credit check, and/or the like), (ii) a risk determination input data field describing a pre-existing risk score (e.g., a credit score) that is associated with the related accounts of the particular registration request, (iii) a risk determination input field describing account ages of the related accounts of the particular registration request, and/or the like. An example of a risk scoring machine learning model is a neural network machine learning model that is trained based on ground-truth risk categories for particular account holders (e.g., ground-truth risk categories determined based on historical activity patterns associated with the particular account holders). In some of the noted embodiments, the neural network machine learning model may be trained using a training routine that comprises an optimization mechanism for optimizing a loss model (e.g., optimizing a loss model using a local optimization technique such as using a gradient-descent-based) as well as a mechanism for propagating loss model optimizations across various layers of the neural network machine learning model (e.g., using a backpropagation mechanism that propagates a gradient of the loss model in a reverse order across the layers of the neural network machine learning model).

In some embodiments, the risk scoring machine learning model is configured to process a plurality of account data features determined based on the plurality of related accounts to generate the preliminary risk category, the plurality of account data features comprise one or more prior risk determination indicators each associated with a respective risk determination check, and each risk determination indicator describes whether at least one related account has previously satisfied requirements of the respective risk determination check.

In some embodiments, the preliminary risk category for the registration request is selected from a set of C risk categories, such as a high risk category, a medium risk category, and a low risk category. In some embodiments, each defined risk category for a requested account type is associated with a respective risk determination check (e.g., a credit check) having one or more risk determination data fields. For example, the C risk categories may include a highest category that is associated with a most intensive credit check, a second-highest category that is associated with a second-most intensive credit check, a third-highest category that is associated with a third-most intensive credit check, and all the way up to a Cth-highest category that is associated with a Cth-most intensive credit check. In this way, the higher the selected risk category for a particular registration request, the less data is needed to process the registration request.

At operation 405, the electronic data management system 102 performs one or more account registration management operations with respect to the account registration session to generate a real-time registration processing output for the account registration session based on the preliminary risk category for the registration request. In some embodiments, a real-time registration processing output describes a determination about whether successful processing of a registration request associated with a corresponding account registration session requires any user actions and/or any user-provided data fields, where the noted determination is determined during or shortly after (e.g., within seconds, minutes, hours of, as defined by the service level objectives of the corresponding electronic platform) the corresponding account registration session. In some embodiments, the real-time registration processing output describes particular risk determination data fields for a particular risk determination check are needed to complete processing of the registration request, where the particular risk determination check is the respective risk determination check for the preliminary risk category associated with the registration request. In some embodiments, the real-time registration processing output describes that no risk determination data fields are needed to complete processing of the registration request as the preliminary risk category does not require a respective risk determination check. In some embodiments, the real-time registration processing output describes a need for at least one of: (i) user approval of a particular risk determination check if the preliminary risk determination for the registration request is associated with a respective determination check, or (ii) user approval of the complete processing of the registration request if the preliminary risk determination for the registration request is not associated with a respective determination check.

At operation 406, the electronic data management system 102 generates one or more account registration notifications based on the real-time registration processing output. In some embodiments, if the real-time registration processing output describes that particular risk determination data fields for a particular risk determination check are needed to complete processing of the registration request, then the one or more account registration notifications comprise notifications for providing the noted risk determination data fields. In some embodiments, if the real-time registration processing output describes a need for user approval of a particular risk determination check, then the one or more account registration notifications comprise notifications for providing the noted approval. In some embodiments, if the real-time registration processing output describes a need for user approval of complete processing of a particular registration request, then the one or more account registration notifications comprise notifications for providing the noted approval.

In some embodiments, the account registration notifications comprise one or more confirmatory request notifications that request user confirmation to open the requested account type. For example, the confirmatory request notification may include a request for a user to sign, initial, or otherwise authorize opening of the requested account type. In some embodiments, generating the one or more confirmatory request notifications and at least one of (i) generating the account registration data object or (ii) generating the real-time registration processing output occur concurrently. In some embodiments, the one or more account registration notifications comprise an indication of a status of the account registration for the user. In some of the noted embodiments, the status of various account registrations is displayed by a user computing device via an account registration status display user interface, such as the account registration status display user interface 1300 of FIG. 13 that displays various account registration status indicators, such as the account registration status indicator 1301 or the account registration status indicator 1302.

In some embodiments, each account registration notification is transmitted to a communication device (e.g., a computer device, a telephone device, a fax device, and/or the like) of the user. For example, in some embodiments, an account registration notification may be transmitted via an email and/or via a real-time notification to a computing device of the user. As another example, in some embodiments, an account registration notification may be transmitted via an automated phone call and/or via a text message to a telephone (e.g., a cell phone) device of the user. As a further example, in some embodiments, an account registration notification may be transmitted via an automatically-generated fax message to a fax device of the user.

Cross-Account Relationship Data Aggregation Operations

FIG. 6 is a flowchart diagram of an example process 600 for generating cross-account relationship data for a set of registered accounts of an electronic platform. Via the various operations of the process 600, the electronic data management system 102 can generate cross-account relationship data that can be used to identify related accounts for a registration request as part of processing the registration request during the corresponding account registration session. However, a person of ordinary skill in the relevant technology will recognize that cross-account relationship data may be used to perform tasks in addition to or instead of account registration session management operations described herein. Moreover, while the process 600 is described herein as being performed by the same computing entity as the computing entity that is configured to manage the account registration session in accordance with the process 400 (i.e., by the electronic data management system 102), a person of ordinary skill in the relevant technology will recognize that, in some embodiments, a first computing entity may be configured to perform data aggregation operations configured to generate cross-account relationship data, while a second and different computing entity may be configured to perform account registration session management operations configured to manage account registration sessions.

The process 600 begins at operation 601 when the electronic data management system 102 retrieves a set of account data sources each containing data associated with a set of user accounts. The set of account data sources may include internal account sources maintained by the electronic data management system as well as external account sources retrieved via API calls to an external API. In some embodiments, retrieving the set of account data sources is performed using the data aggregation workflow 1400 of FIG. 14, which comprises: (i) at operation 1401, transmitting a data aggregation request to a multi-stream data retrieval facilitator such as Apache Kafka, (ii) at operation 1402, determining which account data sources need to be retrieved by determining missing and/or expired account data, (iii) at operation 1403, requesting a set of concurrent services to listen to data streams associated with the needed account data sources, (iv) at operation 1404, aggregating the collected data streams, and (v) at operation 1405, storing the aggregated data in an aggregated data repository (e.g., using a non-structured data format, such as using a MongoDB format and on a MongoDB cache storage framework).

At operation 602, the electronic data management system 102 identifies relationships across account data objects identified in the set of account data sources. In some embodiments, the relationships across account data objects are identified based on common individual identifiers (e.g., common social security numbers) and/or based on common entity identifiers (e.g., common company names). In some embodiments, when a relationship is identified between a pair of account data objects, then the relationship is recorded as part of cross-account relationship data.

At operation 603, the electronic data management system 102 generates cross-account relationship data based on the relationship across account data objects that were identified in operation 602. In some embodiments, the cross-account relationship data describes each account data object identified in the set of account data sources as well as relationships between sets of account data objects. In some embodiments, if a first account is determined to be related to a second account, and a second account is determined to be related to a third account, then all three accounts will be recorded as related accounts according to the cross-account relationship data. In some embodiments, cross-account relationship data is provided to the electronic data management system 102 using a graph-based API, such as using a graph query language (QL).

Conclusion

As described above, example embodiments provide methods and apparatuses that enable an improved account registration management system configured to generate a component of a real-time registration processing output during the account registration session. As such, the disclosed techniques enable reducing the data processing time associated with generating the real-time registration processing output, thus increasing the speed and operational reliability of an electronic data management system that is configured to perform account registration management operations.

The account registration management system may further increase speed and operational reliability of the electronic data management system that is configured to perform account registration management operations by performing parallel processing operations. For example, during an account registration session that is triggered by a particular registration request, after identifying the related accounts for the particular registration request and generating the account registration data object for the particular registration request, the electronic data management system may concurrently (e.g., using two separate processes/threads performed on the same computing entity or using two computing entities that execute using a parallel processing arrangement): (i) enable the user to provide input data values to complete the missing input fields of the account registration data object and/or to change the pre-populated input fields of the account registration data object, and (ii) generate a preliminary risk category based on risk determination input data. In some of the noted embodiments, this concurrent processing enables the electronic data management system to generate a real-time registration processing output for the particular registration request during or shortly after the account registration session, which in turn enables generating account registration notifications during or shortly after the account registration session. For example, the one or more confirmatory request notifications and at least one of (i) generating the account registration data object or (ii) generating the real-time registration processing output may occur concurrently.

FIGS. 4-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

The invention claimed is:

1. A computer-implemented method for managing an account registration session using real-time risk scoring and cross-account inferences, the computer-implemented method comprising:
during the account registration session:
receiving a registration request indicative of a requested account type and a user corresponding to the requested account type, wherein the registration request includes one or more authenticated credentials;
determining, based on the registration request, one or more related accounts associated with the user;
generating, based on the registration request and the one or more related accounts, an account registration data object, wherein one or more input fields of the account registration data object are automatically populated with values described by one or more values defined in the one or more related accounts;
determining, based on the one or more related accounts and using a risk scoring machine learning model, a preliminary risk category for the registration request, wherein the preliminary risk category is associated with a risk determination check;
determining whether the risk determination check is associated with one or more risk determination data fields;
performing one or more account registration management operations with respect to the account registration session to generate a real-time registration processing output for the account registration session based on the preliminary risk category, wherein in an instance in which the risk determination check is associated with the one or more risk or more associated risk determination data fields; and
generating one or more account registration notifications based on the real-time registration processing output.

2. The computer-implemented method of claim 1, the computer-implemented method further comprising:
determining an aggregated data repository associated with the account registration session, wherein the aggregated data repository comprises account data associated with the one or more related accounts;
determining one or more matching data fields that have corresponding data values in the aggregated data repository for one or more input fields of the account registration data object; and
updating the one or more input fields of the account registration data object based on the one or more matching data fields.

3. The computer-implemented method of claim 1, the computer-implemented method further comprising:
determining one or more required data fields of the account registration data object which are associated with incomplete values; and
providing a supplemental data request to a user device, wherein the supplemental data request comprises one or more input request notifications that request user entry of data values corresponding to the one or more required data fields associated with incomplete values.

4. The computer-implemented method of claim 3, the computer-implemented method further comprising:
receiving a supplemental data response from the user device, wherein the supplemental data response includes user input corresponding the one or more required data fields associated with the incomplete values; and
updating the one or more required data fields of the account registration data object based on the supplemental data response.

5. The computer-implemented method of claim 1, wherein:
the one or more related accounts comprise one or more authenticated accounts and one or more secondary accounts, and
each secondary account is determined to be related to at least one authenticated account based on cross-account relationship data.

6. The computer-implemented method of claim 5, wherein the cross-account relationship data comprises a cross-account relationship graph data object that describes account relationship links across a group of account nodes.

7. The computer-implemented method of claim 1, wherein:
the risk scoring machine learning model is configured to process a plurality of account data features determined based on the one or more related accounts to generate the preliminary risk category,
the plurality of account data features comprise one or more prior risk determination indicators each associated with a respective risk determination check, and
each risk determination indicator describes whether at least one of the one or more related accounts has previously satisfied requirements of the respective risk determination check.

8. The computer-implemented method of claim 1, the computer-implemented method further comprising:
generating one or more confirmatory request notifications that request user confirmation to open the requested account type.

9. The computer-implemented method of claim 8, wherein generating the one or more confirmatory request notifications and at least one of (i) generating the account registration data object or (ii) generating the real-time registration processing output occur concurrently.

10. The computer-implemented method of claim 1, wherein the one or more account registration notifications comprise an indication of a status of an account registration for the user.

11. The computer-implemented method of claim 1, wherein the one or more authenticated credentials are associated with either the user or an institution associated with the user.

12. The computer-implemented method of claim 1, wherein the one or more account registration notifications comprise a notification for providing a user approval for the risk determination check.

13. An apparatus for managing an account registration session using real-time risk scoring and cross-account inferences, the apparatus comprising a processor and at least one memory including program code, the at least one memory and the program code configured to, with the processor, cause the apparatus to:
during the account registration session:
receive a registration request indicative of a requested account type and a user corresponding to the requested account type, wherein the registration request includes one or more authenticated credentials;

determine, based on the registration request, one or more related accounts associated with the user;

generate, based on the registration request and the one or more related accounts, an account registration data object, wherein one or more input fields of the account registration data object are automatically populated with values described by one or more values defined in the one or more related accounts;

determine, based on the one or more related accounts and using a risk scoring machine learning model, a preliminary risk category for the registration request, wherein the preliminary risk category is associated with a risk determination check;

determine whether the risk determination check is associated with one or more risk determination data fields;

perform one or more account registration management operations with respect to the account registration session to generate a real-time registration processing output for the account registration session based on the preliminary risk category, wherein in an instance in which the risk determination check is associated with the one or more risk determination data fields, the real-time registration processing output comprises the one or more associated risk determination data fields; and generate one or more account registration notifications based on the real-time registration processing output.

14. The apparatus of claim 13, wherein the at least one memory and the program code are configured to, with the processor, cause the apparatus to:

determining an aggregated data repository associated with the account registration session, wherein the aggregated data repository comprises account data associated with the one or more related accounts;

determining one or more matching data fields that have corresponding data values in the aggregated data repository for one or more input fields of the account registration data object; and updating the one or more input fields of the account registration data object based on the one or more matching data fields.

15. The apparatus of claim 13, wherein the at least one memory and the program code are configured to, with the processor, cause the apparatus to:

determining one or more required data fields of the account registration data object which are associated with incomplete values; and providing a supplemental data request to a user device, wherein the supplemental data request comprises one or more input request notifications that request user entry of data values corresponding to the one or more required data fields associated with incomplete values.

16. The apparatus of claim 15, wherein the at least one memory and the program code are configured to, with the processor, cause the apparatus to:

receiving a supplemental data response from the user device, wherein the supplemental data response includes user input corresponding the one or more required data fields associated with the incomplete values; and updating the one or more required data fields of the account registration data object based on the supplemental data response.

17. The apparatus of claim 13, wherein:

the one or more related accounts comprise one or more authenticated accounts and one or more secondary accounts, and each secondary account is determined to be related to at least one authenticated account based on cross-account relationship data.

18. The apparatus of claim 17, wherein the cross-account relationship data comprises a cross-account relationship graph data object that describes account relationship links across a group of account nodes.

19. The apparatus of claim 18, wherein:

the risk scoring machine learning model is configured to process a plurality of account data features determined based on the one or more related accounts to generate the preliminary risk category, the plurality of account data features comprise one or more prior risk determination indicators each associated with a respective risk determination check, and each risk determination indicator describes whether at least one of the one or more related accounts has previously satisfied requirements of the respective risk determination check.

20. A computer program product for managing an account registration session using real-time risk scoring and cross-account inferences, the computer program product comprising at least one non-transitory computer-readable storage medium storing computer-executable instructions that, when executed, cause an apparatus to:

during the account registration session:

receive a registration request indicative of a requested account type and a user corresponding to the requested account type, wherein the registration request includes one or more authenticated credentials;

determine, based on the registration request, one or more related accounts associated with the user;

generate, based on the registration request and the one or more related accounts, an account registration data object, wherein one or more input fields of the account registration data object are automatically populated with values described by one or more values defined in the one or more related accounts;

determine, based on the one or more related accounts and using a risk scoring machine learning model, a preliminary risk category for the registration request, wherein the preliminary risk category associated with a risk determination check;

determine whether the risk determination check is associated with one or more risk determination data fields;

perform one or more account registration management operations with respect to the account registration session to generate a real-time registration processing output for the account registration session based on the preliminary risk category, wherein in an instance in which the risk determination check is associated with the one or more risk determination data fields, the real-time registration processing output comprises the one or more associated risk determination data fields; and generate one or more account registration notifications based on the real-time registration processing output.

* * * * *